Nov. 11, 1947.   M. J. DE GOOD   2,430,603
CLUTCH
Filed Dec. 3, 1945
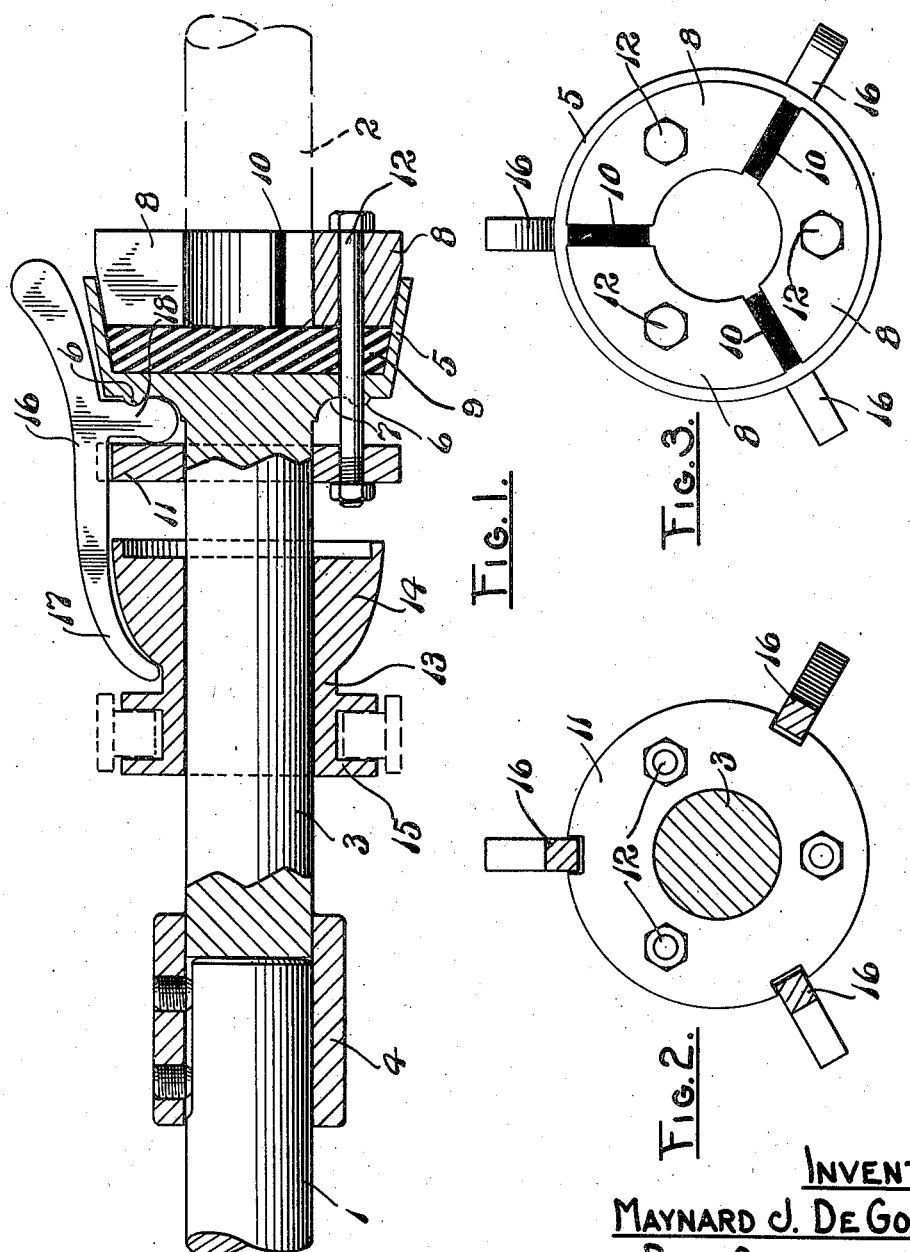
INVENTOR
MAYNARD J. DE GOOD
BY Liverance and
Van Antwerp
ATTORNEYS Patented Nov. 11, 1947

2,430,603

UNITED STATES PATENT OFFICE 2,430,603

CLUTCH

Maynard J. De Good, Grand Rapids, Mich., assignor to Nelson Machine Tool Company, Grand Rapids, Mich., a partnership of Michigan Application December 3, 1945, Serial No. 632,360

6 Claims. (Cl. 192—79)

This invention relates to a clutch construction of a simple, practical and novel form, readily manufactured and assembled, and by means of which a driving and a driven shaft may be connected at will for driving the latter shaft by the former, and similarly disconnected.

It is a primary object and purpose of the present invention to provide a clutch construction of the character specified which, as a unit, may be built for use and applied to shafts where it may be of utility, said shafts requiring no special machining or fitting for the application and use of the clutch with respect thereto.

An understanding of the invention may be had from the following description, taken in connection with the accompanying drawing, in which Fig. 1 is a longitudinal vertical section through the clutch construction of my invention.

Fig. 2 is a transverse section through the clutch, and

Fig. 3 is an end elevation looking at the clutch from the right.

Like reference characters refer to like parts in the different figures of the drawing.

Between a driving shaft 1 and a driven shaft, indicated at 2, in alinement therewith, the clutch construction of my invention is adapted to be interposed. It includes a short shaft 3 to which at the end thereof, and which is to be in substantial abutting engagement with the end of the driving shaft 1, a sleeve 4 may be permanently connected by welding, brazing or the like, carrying set screws for the secure connection thereof to the shaft 1, as shown in Fig. 1.

At the opposite end of the shaft 3 a cone shaped cup 5 having outwardly diverging annular walls is integrally formed, at the inner side of the bottom of which an annular rib 6 is provided within which an annular concave groove 7 is defined. At the open end of the cup a plurality of radially positioned clutch members 8 are disposed, having the outer surfaces thereof of a complementary conical form to fit against the inner sides of the walls of the cup 5, which members at their inner ends bear against a rubber disk 9, seated in the bottom of the described cup member. Three of the clutch members 8 are shown, each substantially one-third of the circular arc but spaced apart short distances at their adjacent ends. In the spaces between the ends fillers 10, which likewise may be of rubber or equivalent material, are located.

A flat disk 11 with a central opening for the passage of the shaft 3 is mounted on said shaft and spaced a short distance from the cup member described. Bolts 12 one for each of the clutch members 8 pass through the disk 11, the bottom of the cup member, the rubber member 9 and each of said clutch members as shown, thereby holding said members 8 within the cup 5 against disconnection.

On the shaft 3 spaced a short distance from the disk 11 a slidable clutch operating member 13 is mounted. At one end said member has an enlarged body 14 of progressively increasing diameter toward the disk 11, and at the other end a collar 15 to be engaged by a yoke, indicated in dotted lines, for moving the operating member back and forth longitudinally of the shaft 3.

A plurality of levers 16 are disposed in spaced relation around the disk 11, which at its edges is notched, as shown at Fig. 2, to hold said levers against lateral movement. Each of the levers at one end and extending over the body 14 is curved inwardly as at 17 and each lever between its ends has an inwardly extending arm 18 passing between the disk 11 and the cup 5 and rounded at its free end for bearing in the concave recess 7 previously described.

With the end of the driven shaft 2 inserted into the central opening between the inner ends of the clutch members 8, by moving the operating member 13 to the left the levers 16 are moved outwardly at the inwardly curved end portions 17 thereof, and with the rib 6 as a fulcrum about which the levers turn the disk 11 is moved to the left with a consequent drawing of the clutch members into the cup 5 against the rubber member 9. And they will also be forced simultaneously radially inward, compressing the fillers 10 and gripping the shaft 2 at their curved inner sides or ends. On release of the operating member to thereby release the clutch, the resiliency of the rubber members 9 and 10 will cause such members 8 to move to their outer initial positions, thereupon disconnecting from and releasing the driven shaft 2.

The clutch structure described is useful in many relations for connecting driving and driven shafts. It is very quickly and readily applied, is of a simple and economical construction, quickly assembled and of great utility. By turning the nuts on the ends of the bolts 12 any necessary adjustments required may be made.

The invention is defined in the appended claims and is to be considered comprehensive of all forms of structure coming within their scope.

I claim:

1. A driving shaft, a clutch construction connected with said shaft in axial alignment including, a short shaft provided with a conical cup at one end open at its outer end, a disc slidably mounted on the short shaft adjacent the cup, a plurality of radially disposed clutch members extending into the conical cup and having cooperating outer conical surfaces to bear against the inner sides of said cup, bolts passed one through each said clutch members and through the bottom of said cup and said disc, yielding means between said clutch members and the bottom of the cup and between adjacent ends of the clutch members, means interposed between said cup and adjacent side of said disc operatable for moving the disc away from the cup and forcing the clutch members inwardly, and means mounted on said shaft for actuating said last mentioned means, said clutch members at their inner sides being formed so that when moved in towards each other they will grip the end of the shaft to be driven inserted in said cup between the clutch members.

2. A construction as defined in claim 1, said yielding means at the inner sides of said clutch members comprising, a disc of rubber composition or equivalent resilient material seated against the bottom of the cup, and the yielding means between the adjacent ends of the clutch members comprising similar resilient material.

3. A construction as defined in claim 1, said means between the bottom of the cup and said disc comprising inwardly extending arms secured one to each of a plurality of levers disposed in spaced relation around said disc, said arms at their inner ends being fulcrumed on the bottom of the cup, whereby on swinging the levers in one direction the disc is bodily moved away from said cup, and the means movably mounted on said shaft comprising a body having at one end an enlargement of progressively increasing diameter in cross-section against which one end of each of said levers bears for turning said levers on longitudinal movement of said body on the short shaft in a direction away from the disc.

4. A clutch construction comprising, a short shaft, means at one end thereof for detachable connection to a driving shaft, a cone clutch cup at the outer end of the shaft, an actuating member slidably mounted on said shaft, bolts extending through said member and through the bottom of said cup, a plurality of clutch members extending partly into the open end of the cup through each of which a bolt passes, said clutch members being spaced short distances apart at their ends and radially disposed in the cup and at their inner sides being provided with arc shaped concave surfaces, said clutch members on movement of said actuating member away from the cup being moved inwardly thereinto, and having their inner sides moved radially inward to thereby grip the end of a shaft to be driven inserted between them, and means for moving said member on the shaft for drawing said clutch members inwardly.

5. A construction as defined in claim 4, and yielding means opposing the inward movement of said clutch members and their movement towards each other and acting to return said clutch members to initial outward position when released.

6. A construction as defined in claim 4, and yielding resilient means mounted between said cup and between the ends of said clutch members for yieldingly resisting inwardly movement of said members and acting to return said clutch members to outer position when free to do so, and nuts on said bolts for adjusting said clutch members and the actuating member therefor on said shaft with relation to each other.

MAYNARD J. DE GOOD.